United States Patent
Watanabe et al.

(10) Patent No.: US 6,827,394 B2
(45) Date of Patent: Dec. 7, 2004

(54) VEHICLE SEAT SYSTEM

(75) Inventors: Shinsuke Watanabe, Wako (JP); Masahiro Hara, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/269,185

(22) Filed: Oct. 10, 2002

(65) Prior Publication Data

US 2003/0071492 A1 Apr. 17, 2003

(30) Foreign Application Priority Data

Oct. 16, 2001 (JP) ........................................ 2001-318196

(51) Int. Cl.[7] ................................................ A47C 9/06
(52) U.S. Cl. ...................... 297/15; 297/335; 297/336; 297/236; 297/243; 296/63; 296/65.01; 296/69
(58) Field of Search .......................... 297/15, 335, 336, 297/235, 236, 243; 296/63, 64, 65.01, 66, 69

(56) References Cited

U.S. PATENT DOCUMENTS

| | | | | |
|---|---|---|---|---|
| 4,932,709 A | * | 6/1990 | Wainwright | 296/65.09 |
| 5,492,386 A | | 2/1996 | Callum | |
| 5,740,989 A | * | 4/1998 | Daines | 244/118.6 |

FOREIGN PATENT DOCUMENTS

| | | |
|---|---|---|
| JP | SHO-63-47545 | 12/1988 |
| JP | 3-118241 | 5/1991 |

* cited by examiner

*Primary Examiner*—Laurie K. Cranmer
(74) *Attorney, Agent, or Firm*—Merchant & Gould P.C.

(57) ABSTRACT

A vehicle seat system includes a first-row seat as a driver seat, a second-row seat rearward thereof, and a third-row seat further rearward thereof. The second-row seat can be slid and reclined in a vehicle longitudinal direction. The third-row seat with a seat back folded is stored within a space immediately below the second-row seat. The second-row seat with the third-row seat stored can be slide and reclined in a vehicle longitudinal direction.

3 Claims, 10 Drawing Sheets

VEHICLE SEAT SYSTEM

FIELD OF THE INVENTION

The present invention relates to front and back rows of seats provided in a vehicle rearward passenger compartment behind a driver seat, and more particularly, to a vehicle seat system in which a back-row seat is folded below a front-row seat for storage of the back-row seat.

BACKGROUND OF THE INVENTION

A vehicle seat system in which a back-row seat is folded immediately below a front-row seat for storage of the back-row seat is disclosed, for example, in Japanese Utility Model Laid-Open Publication No. SHO-63-47545 entitled "Storage Structure for Vehicle Double Row Type Folding Seats" or in Japanese Patent Laid-Open Publication No. HEI-3-118241 entitled "Vehicle Seat System."

The storage structure of SHO-63-47545 includes a first seat as a front-row seat and a second seat as a back-row seat which are disposed on the floor of the vehicle rearward passenger compartment. The first seat includes a cushion, a backrest attached to the rear end of the cushion in a foldable manner, a pair of left and right front legs attached to the rear surface of the front end of the cushion in a forwardly tiltable manner, and a U-shaped rear leg attached to the rear surface of the rear of the cushion, being foldable onto the rear surface of the cushion. The second seat includes a cushion, a backrest attached to the rear of the cushion, being foldable onto the upper surface of the cushion, a U-shaped front leg in a plan view rotatably attached to the second cushion, extending between the rear end of the first seat and the front end of the second seat, and a U-shaped storage arm in a plan view rotatably attached to the front leg, extending beneath the first seat.

With this storage structure, the first seat is tilted forward on a hinge on which the front legs of the first seat are rotatably fixed to the floor, and then the backrest of the second seat is folded onto the upper surface of the cushion and forwardly turned around the front end of the storage arm for folding, so that the second seat is stored immediately below the first seat in a horizontally folded state.

In the above storage structure, however, the pair of left and right front legs and the U-shaped rear leg of the first seat are configured to be fixed on the vehicle floor, and therefore the first seat is not slidable in a vehicle longitudinal direction. If the pair of left and right front legs and the rear leg were made slidable in a vehicle longitudinal direction in the above structure, sliding of the first seat would disadvantageously cause the front legs and the rear leg to interfere with the second seat folded and stored immediately below the first seat.

Next, in the seat system of HEI-3-118241, a second seat is longitudinally movably fixed to a vehicle floor portion via a mounting eye and a rear seat is attached on a hinge to a rear floor portion. The rear seat is turned 180 degrees on the hinge in a folded state and positioned immediately below the second seat. The second seat is slidable to the rear with the rear seat folded.

However, this seat system requires, in turning the rear seat 180 degrees in the folded state, supporting the seat back to prevent the seat back from being detached from the seat cushion, providing poor usability. Further, a cut is formed in the rear seat for pulling back the second seat, worsening the appearance of the rear seat.

It is thus desired to allow a vehicle front-row seat to be longitudinally slidable even when a back-row seat is folded and stored immediately below the front seat.

SUMMARY OF THE INVENTION

According to the present invention, there is provided a vehicle seat system, which comprises: a first-row seat as a driver seat; a second-row seat disposed rearward of the first-row seat, the second-row seat being able to be slid and reclined in a vehicle longitudinal direction and also being able to be forwardly turned up; and a third-row seat disposed rearward of the second-row seat, the third-row seat being forwardly movable with a seat back folded onto a seat cushion and being able to be stored within a space immediately below the second-row seat; wherein, the second-row seat can be slid and reclined in a vehicle longitudinal direction even when the second-row seat is brought back onto the third-row seat folded and stored within the space.

Thus, in the present invention, forwardly turning up the second-row seat allows the movement of the folded third-row seat onto the floor and the storage of the folded third-row seat within a mechanism for fixing the second-row seat to the floor. Further, when the second-row seat is brought back onto the stored-state third-row seat, the second-row seat is connected to the mechanism for fixation thereof. Thus the second-row seat slides and reclines without interfering with the stored third-row seat.

Rear end portions of the second- and third-row seats are releasably engaged with the vehicle.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
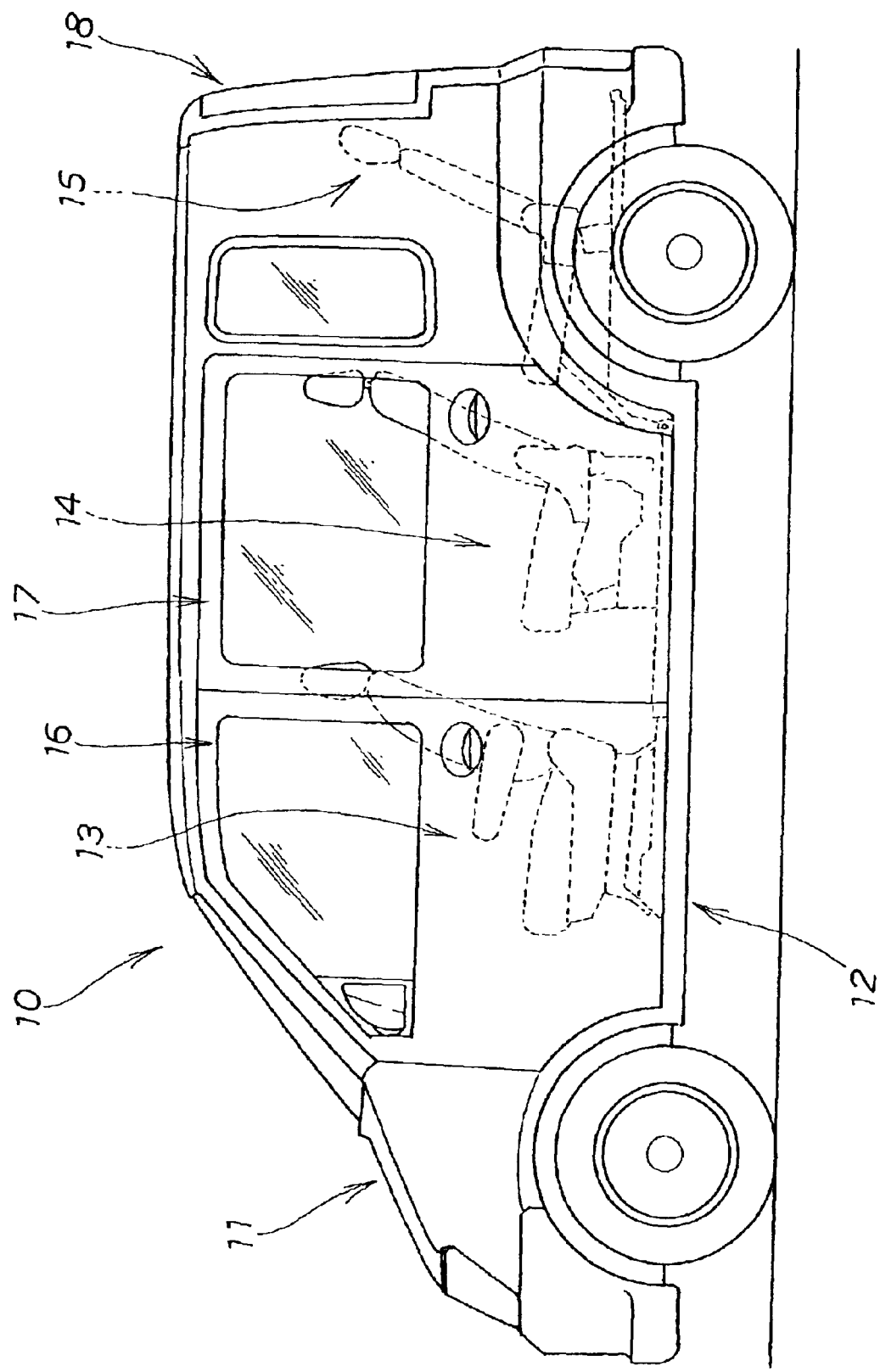
FIG. 1 is a side view of a vehicle using a seat system according to the present invention.

Referring to FIG. 1, a vehicle 10 according to the present invention has three rows of seats. Seats 13 in the first row are a driver seat and a navigator seat. In a rearward passenger compartment behind the first-row seats 13, a seat 14 in the second row as a front row and seats 15 in the third row as a back row are disposed. The first-, second- and third-row seats 13, 14 and 15 are fixed to a floor 12 as the floor of a vehicle body frame 11. Reference numeral 16 denotes a front door and 17 a rear door. A tailgate 18 is provided to the rear of the vehicle 10.

Figure 2:
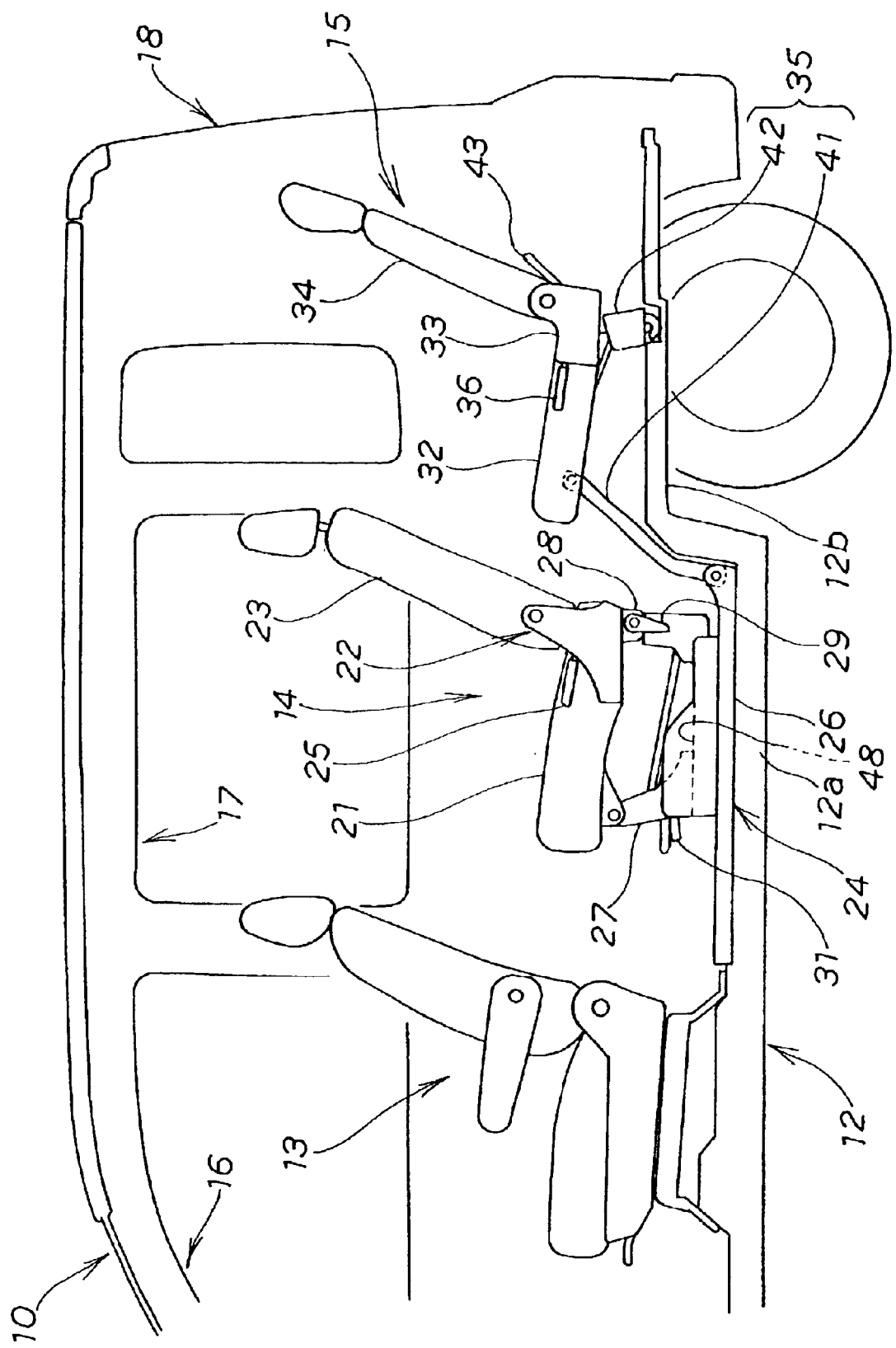
FIG. 2 is a side view of the vehicle illustrating a first-row seat, a second-row seat and a third-row seat arranged on the floor of the vehicle shown in FIG. 1.

As shown in FIG. 2, the floor 12 includes a middle floor 12a and a rear floor 12b formed continuously with the middle floor 12a. The rear floor 12b is higher in height than the middle floor 12a.

The second-row seat 14 has a seat cushion 21 and a seat back 23 attached to the rear thereof via a reclining mechanism 22. A pair of left and right seat supporting mechanisms 24 is attached to the bottom of the seat cushion 21. A reclining lever 25 is operated to adjust the inclination angle of the seat back 23 via the reclining mechanism 22.

The seat supporting mechanisms 24 each consist of a sliding mechanism 26 fixed to the middle floor 12a of the vehicle 10, a front leg 27 attached to a front portion of the sliding mechanism 26, and a rear leg 28 attached to a rear portion thereof. Reference numeral 29 denotes a seat tilting lever and 31 a slide lever.

A storage space for the third-row seats 15 is formed below the seat cushion 21.

The third-row seats 15 are left and right separated seats. A seat back 34 of each of the third-row seats 15 is attached to the rear of a seat cushion 32 via a reclining mechanism 33. A seat supporting mechanism 35 for supporting the third-row seat 15 is mounted below the seat cushion 32. A seat back 34 is tilted via the reclining mechanism 33 by the operation of a reclining lever 36.

The seat supporting mechanism 35 of the third-row seat 15 consists of a link mechanism 41 disposed on the middle floor 12a and a latch mechanism 42 disposed on the rear floor 12b. A pulling eye 43 is arranged behind the seat cushion 32. The position of the pulling eye 43 and the position of the seat tilting lever 29 for the second-row seat 14 are at will.

Figure 3:
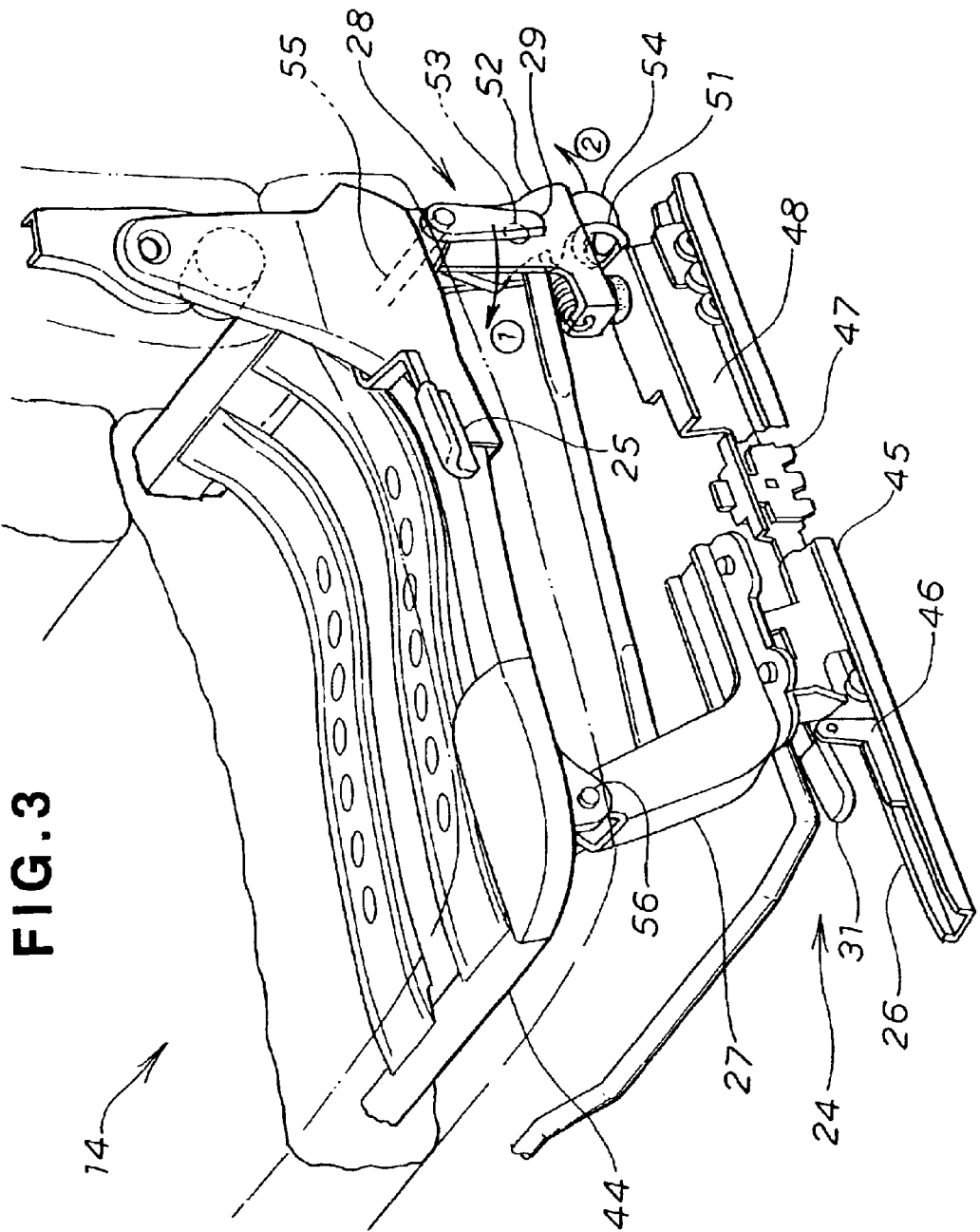
FIG. 3 is a perspective view illustrating a seat supporting mechanism for the second-row seat shown in FIG. 2.

FIG. 3 illustrates the seat supporting mechanism 24 for the second-row seat 14.

The sliding mechanism 26 has a slide rail 45, lock members 46 and 47 operated by the manipulation of the slide lever 31, a bracket 48 provided movably in the longitudinal direction of the slide rail 45, and a striker 51 provided rearward of the bracket 48.

The rear leg 28 has a leg body 52, a hook 54 rotatably attached to the leg body 52 via a pin 53, and the seat tilting lever 29 attached to a rotatable shaft 55.

The front leg 27 is coupled to the bottom of a front portion of a seat frame 44 via a pin 56.

Figure 4:
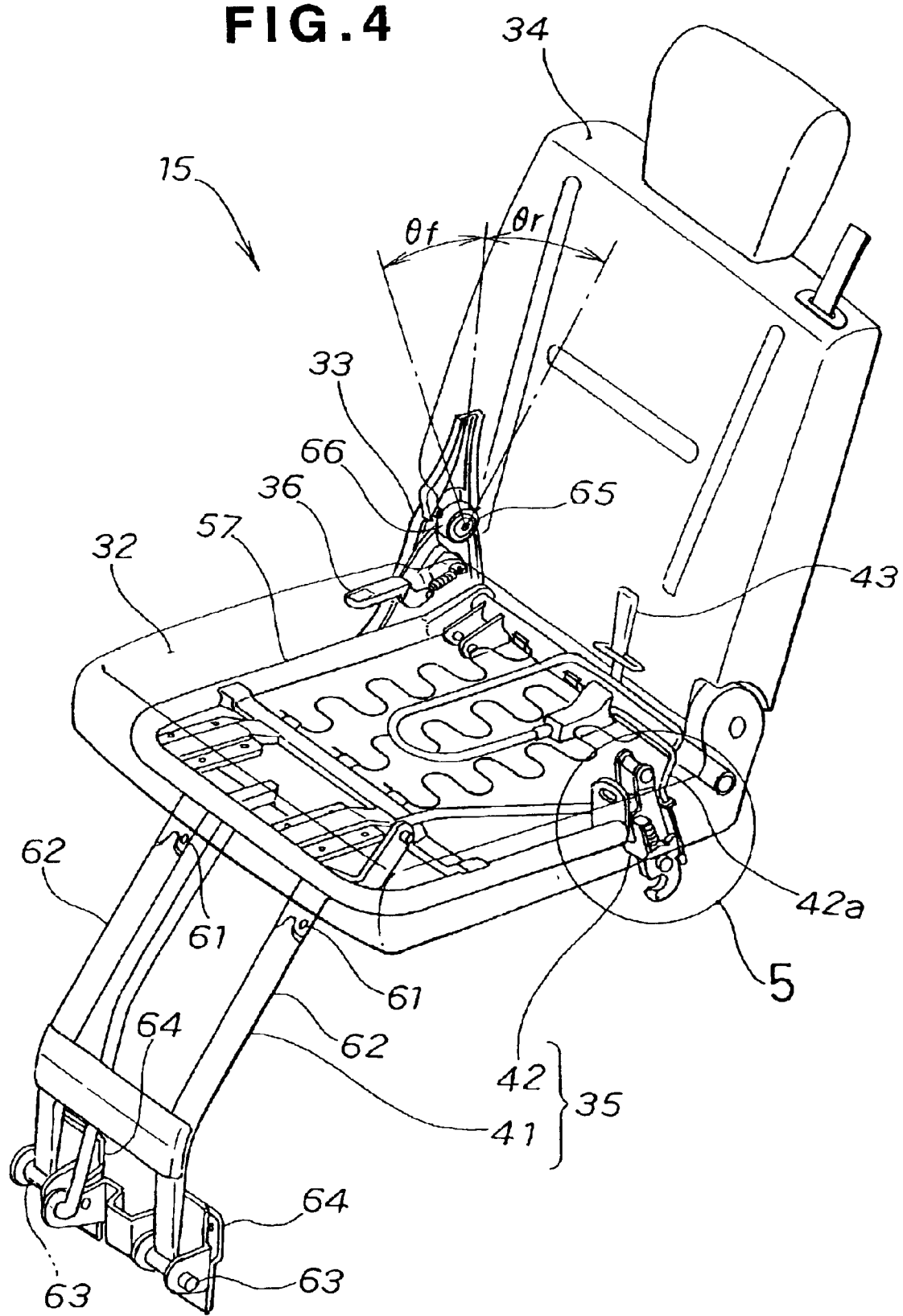
FIG. 4 is a perspective view illustrating a seat supporting mechanism for the third-row seat shown in FIG. 2.

FIG. 4 illustrates the seat supporting mechanism 35 for the third-row seat.

A cable 42a is coupled at one end to the latch mechanism 42 and is connected at the other end to the pulling eye 43 provided at a seat frame 57.

The left seat is similar to the right seat and will not be described.

The link mechanism 41 has a pair of left and right arms 62 coupled to the front end of the seat frame 57 via pins 61, 61 and a pair of brackets 64 coupled to the lower ends of the arms 62 via pins 63, 63. The pair of brackets 64 is fixed to the middle floor 12a shown in FIG. 2.

The reclining mechanism 33 includes an existing reclining member 65 for tilting the seat back 34 within a reclining angle θr and a forward tilting member 66 for tilting and stopping the seat back 34 at a forward inclination angle θf.

Figure 5:
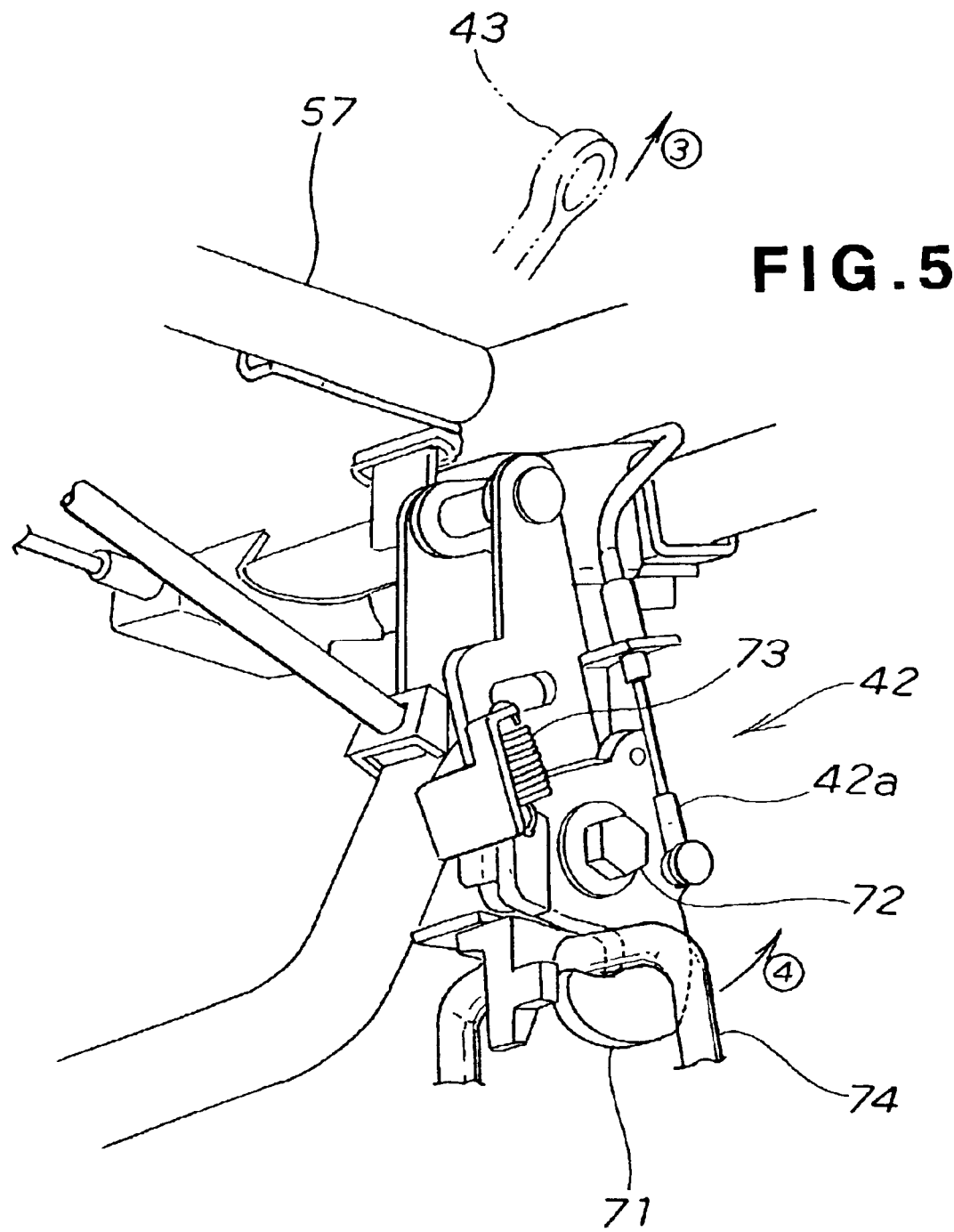
FIG. 5 is a detail view illustrating a portion 5 in FIG. 4 enlarged.

As shown in FIG. 5, the latch mechanism 42 provides releasable engagement with a striker 74 provided on the rear floor 12a shown in FIG. 2. The latch mechanism 42 has a hook 71 rotatably attached to the seat frame 57 via a bolt 72, a return spring 73 provided at a front portion of the hook 71, and the cable 42a connected at one end to a rear portion of the hook 71. Pulling the pulling eye 43 pulls the cable 42a, causing the hook 71 to rotate on the bolt 72 in the direction of an arrow, and thereby releasing the engagement between the hook 71 and the striker 74.

Now the function of the above-described vehicle seat system will be described.

First, with FIG. 3, forwardly turning up the second-row seat 14 will be described.

As shown in FIG. 3, when the seat tiling lever 29 is rotated in the direction of arrow ①, the hook 54 rotates on the pin 53 as shown by arrow ②, disengaging from the striker. This enables detaching the rear leg 28 from the bracket 48 of the sliding mechanism 26, forwardly turning up the second-row seat 14 on the pin 56 of the front leg 27.

Now unlocking of the third-row seat 15 will be described.

As shown in FIG. 5, when the pulling eye 43 is pulled as shown by arrow ③, the hook 71 rotates on the bolt 72 as shown by arrow ④, disengaging from the striker 74. This enables detaching the latch mechanism 42 from the rear floor.

The storage of the third-row seat 15 below the second-row seat 14 will be described.

Figure 6:
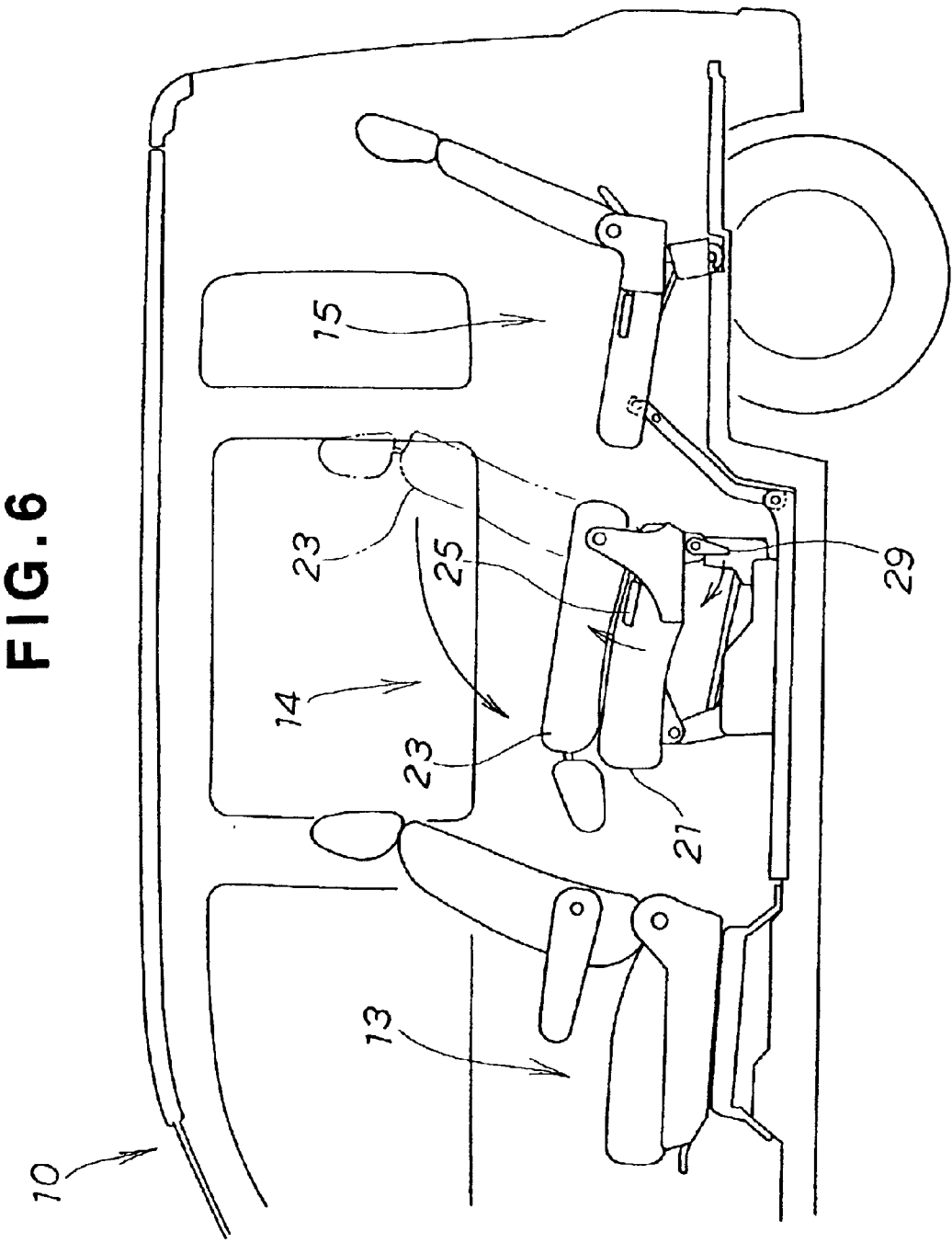
FIG. 6 is a side view of the vehicle illustrating a seat back of the second-row seat tilted forward and folded.

FIG. 6 is a first functional diagram of the vehicle seat system according to the present invention.

When the reclining lever 25 of the second-row seat 14 is pulled up, the seat back 23 shown in chain double-dashed lines tilts forward as shown by an arrow and lies on the seat cushion 21 in a folded state as shown by solid lines.

Then, the seat tilting lever 29 is operated to disengage the hook 54 from the striker 51 as described with FIG. 3, releasing the lock between the second-row seat 14 and the bracket 48 of the sliding mechanism 26.

Figure 7:
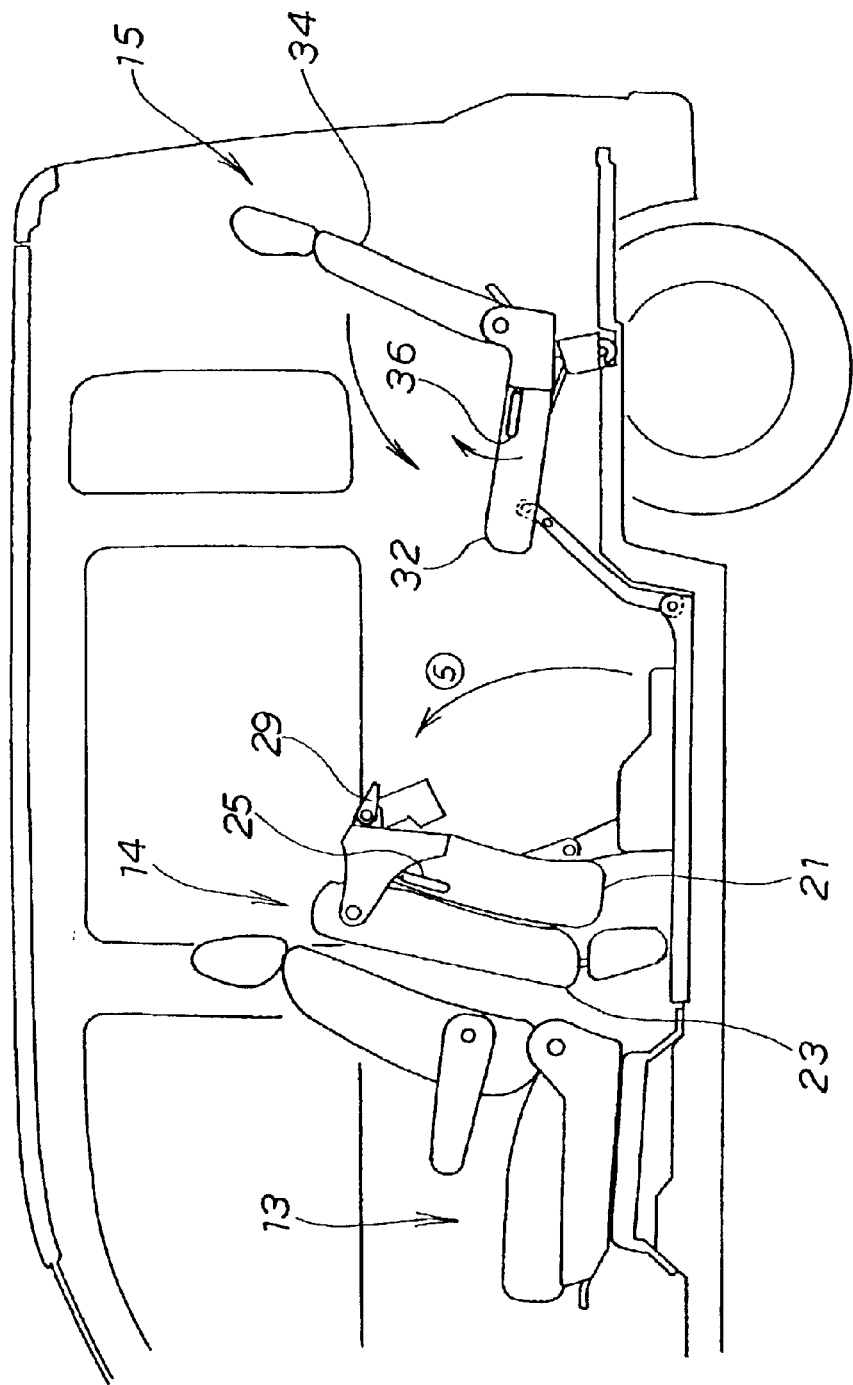
FIG. 7 is a side view of the vehicle illustrating the second-row seat forwardly turned up with the seat back folded.

After releasing the lock by the seat tilting lever 29, the second-row seat 14 is, as shown in FIG. 7, forwardly turned up as shown by arrow ⑤ with the seat back 23 folded onto the seat cushion 21.

Continuously, the reclining lever 36 of the third-row seat 15 is pulled up to tilt the seat back 34 forward as shown by an arrow.

Figure 8:
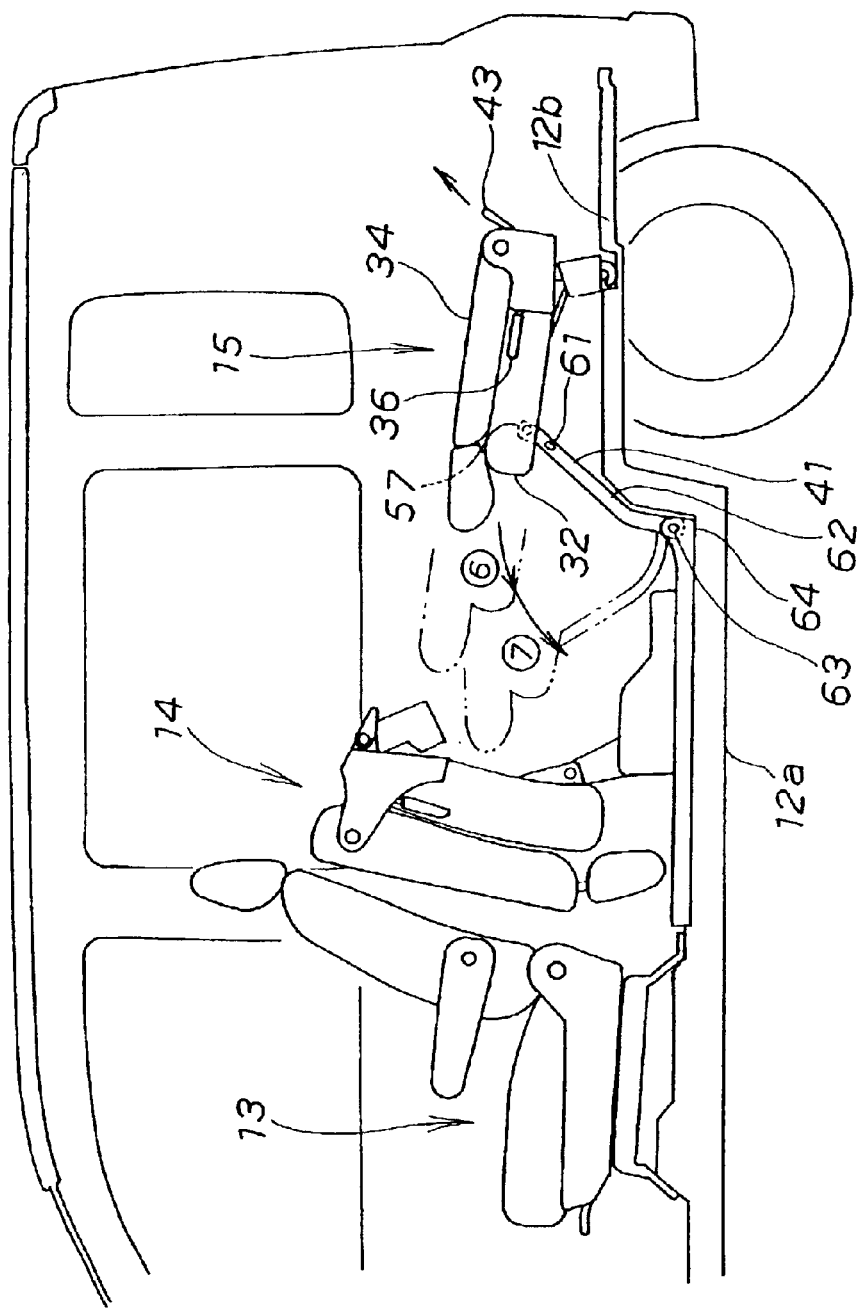
FIG. 8 is a side view of the vehicle illustrating a seat back of the third-row seat tilted forward and folded.

As described above, rotating the reclining lever 36 of the third-row seat 15 in the arrow direction causes the seat back 34 to be folded onto the seat cushion 32 as shown in FIG. 8.

Then, the pulling eye 43 is pulled to disengage the hook 71 from the striker 74 shown in FIG. 5 fixed to the rear floor 12b. Thus the lock between the third-row seat 15 and the striker 74 is released. The folded third-row seat 15 is moved forward to be stored on the middle floor 12a.

In the link mechanism 41 of the third-row seat 15, the arms 62 are coupled to the front end of the seat frame 57 via the pins 61 and the brackets 64 are coupled to the arms 61 via the pins 63, so that the third-row seat 15 in a folded state horizontally moves forward with the arms 62 as shown by arrows ⑥ and ⑦. The seat back 34 is not detached from the seat cushion 32. It is thus facilitated to forwardly move the folded third-row seat 15 and store it on the middle floor 12a, improving maneuverability.

Figure 9:
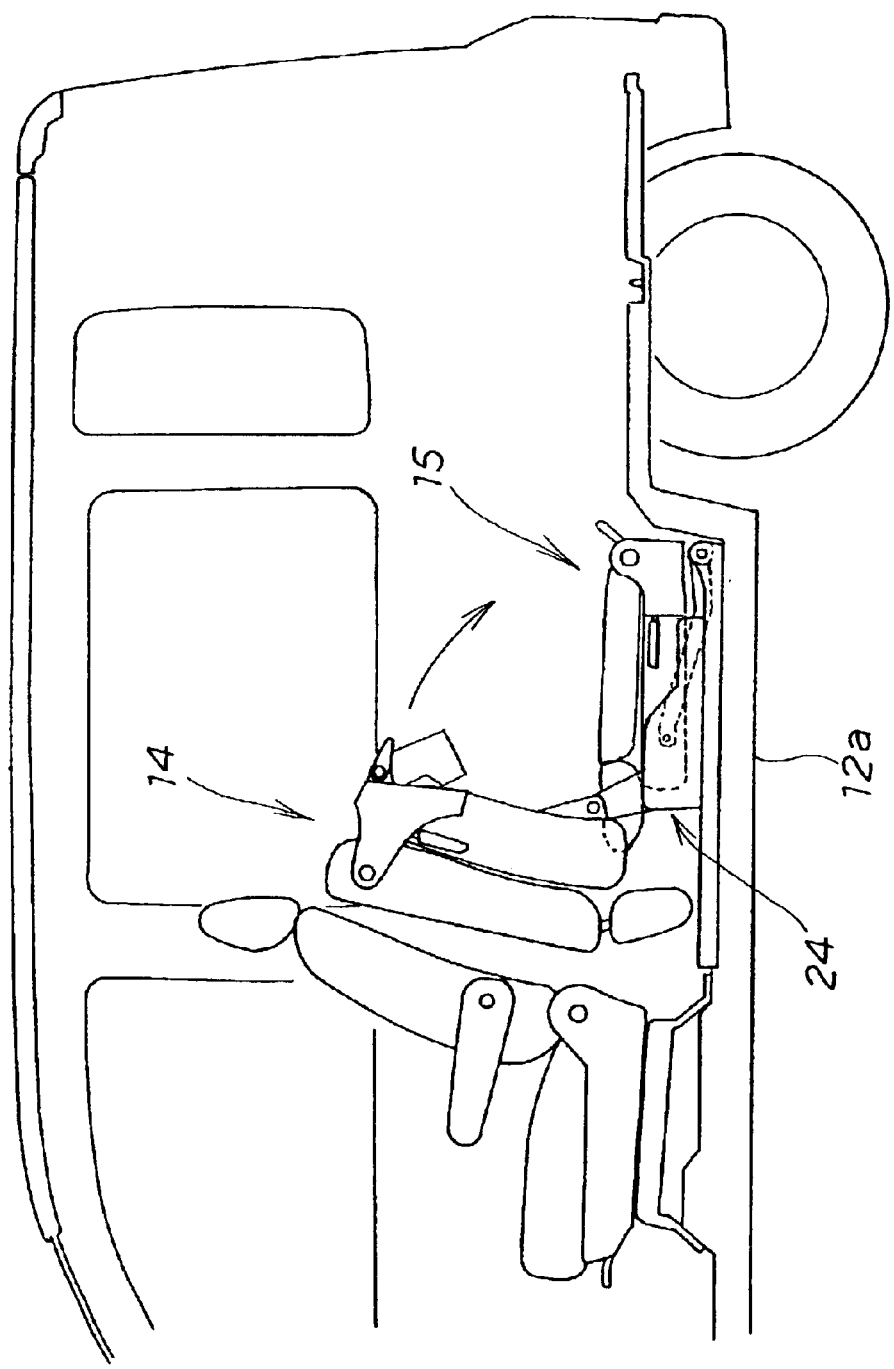
FIG. 9 is a side view of the vehicle illustrating the third-row seat with the seat back folded, being stored in a storage space of the turned-up second-row seat.

FIG. 9 illustrates the third-row seat 15 folded within the seat supporting mechanisms 24 as described above. That is, the folded third-row seat 15 is moved forward and positioned on the middle floor 12a, thereby to store the folded third-row seat 15 within the seat supporting mechanisms 24.

Continuously, the second-row seat 14 is brought back onto the stored third-row seat 15.

Figure 10:
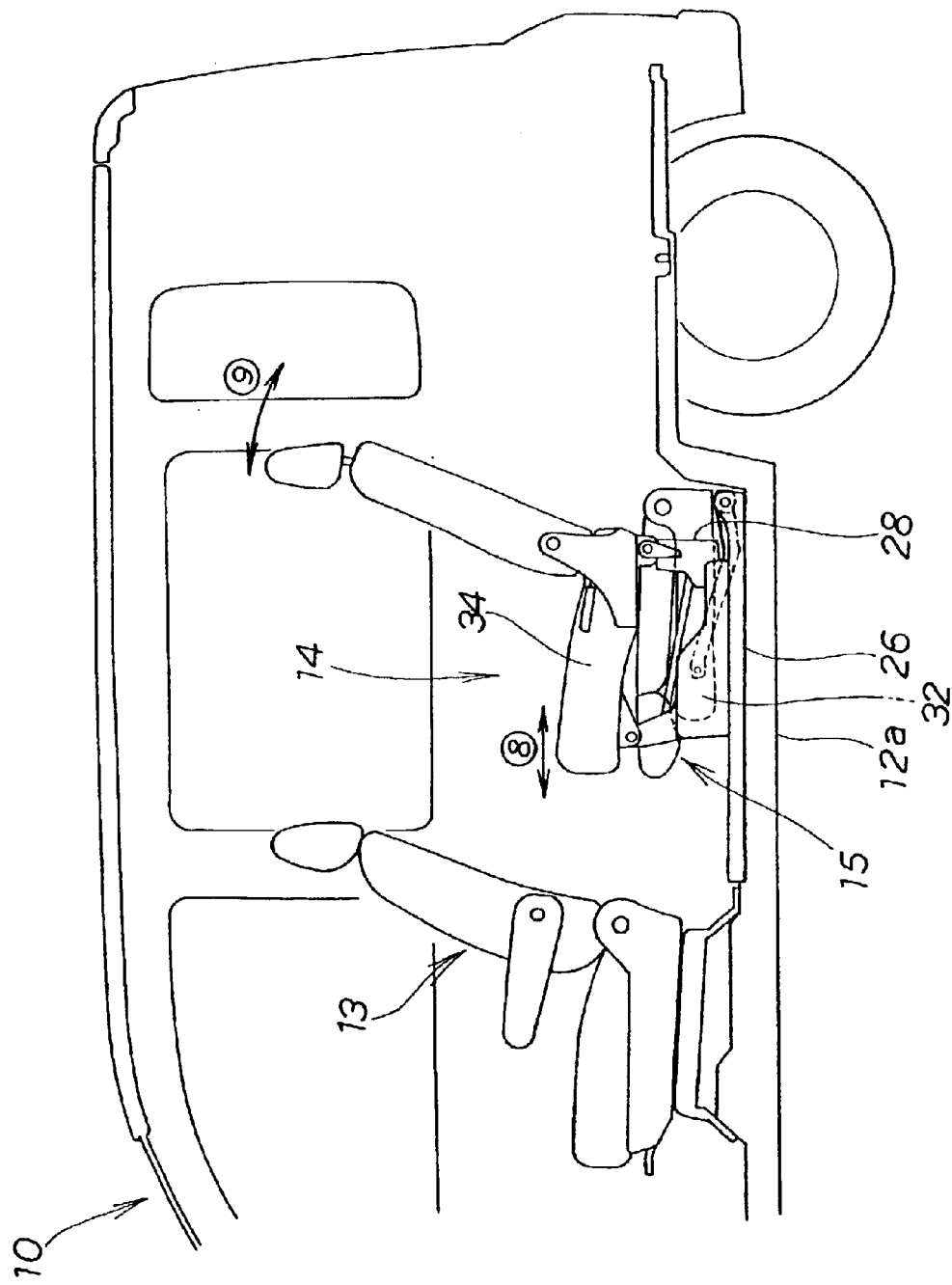
FIG. 10 is a side view of the vehicle illustrating the second-row seat turned back from the turned-up position and the folded third-row seat stored in the space immediately below the second-row seat.

As shown in FIG. 10, when the second-row seat 14 is brought back above the stored third-row seat 15, the rear leg 28 is locked at the same time to the sliding mechanism 26 by the hook 54 of the rear leg 28 (See FIG. 3). As a result, without interfering the third-row seat 15 folded and stored on the middle floor 12a, the second-row seat 14 can be longitudinally slid as shown by arrow ⑧ and reclined as shown by arrow ⑨.

Although the above embodiment has been described with the second-row seat 14 as a bench seat, the configuration of the second-row seat is any in the present invention.

The present disclosure relates to the subject matter of Japanese Patent Application No. 2001-318196, filed Oct. 16, 2001, the disclosure of which is expressly incorporated herein by reference in its entirety.

What is claimed is:

1. A vehicle seat system, comprising:

a first-row seat as a driver seat;

a second-row seat disposed rearward of said first-row seat, said second-row seating being able to be slid and reclined in a vehicle longitudinal direction and also being able to be forwardly turned up; and a third-row seat disposed rearward of said second-row seat, said third-row seat being horizontally movable forward with a seat back folded on top a seat cushion and being able to be stored within a space immediately below said second-row seat while the seat back remains folded on top of the seat cushions, wherein said second-row seat can be slid and reclined in a vehicle longitudinal direction even when said second-row seat is stored immediately below the second-row seat;

wherein the vehicle includes a floor having a first floor part and a second floor part continuous with the first floor part and higher in height than the first floor part, the second-row seat is disposed on the first floor part, and the third-row seat is normally disposed on the second floor part and includes an arm having a first end pivotally connected to the first floor part and a second end pivotally connected to a front end portion of the third-row seat, the pivot arm being pivotally movable about the first end thereof to undergo horizontal movement of the third-row seat.

2. A vehicle seat system according to claim 1, wherein a rear end portion of said second-row seat is releasably engaged with said vehicle.

3. A vehicle seat system according to claim 1, wherein a rear end portion of said third-row seat is releasably engaged with said vehicle.

* * * * *